United States Patent
Fuse et al.

(10) Patent No.: US 10,279,657 B2
(45) Date of Patent: May 7, 2019

(54) ENERGY MANAGEMENT SYSTEM

(71) Applicant: DENSO CORPORATION, Kariya, Aichi-pref. (JP)

(72) Inventors: Takuya Fuse, Kariya (JP); Shinya Kasamatsu, Kariya (JP); Yasushi Kouno, Kariya (JP)

(73) Assignee: DENSO CORPORATION, Kariya (JP)

(*) Notice: Subject to any disclaimer, the term of this patent is extended or adjusted under 35 U.S.C. 154(b) by 310 days.

(21) Appl. No.: 15/329,608

(22) PCT Filed: Jul. 9, 2015

(86) PCT No.: PCT/JP2015/003479
§ 371 (c)(1),
(2) Date: Jan. 27, 2017

(87) PCT Pub. No.: WO2016/017083
PCT Pub. Date: Feb. 4, 2016

(65) Prior Publication Data
US 2017/0210204 A1    Jul. 27, 2017

(30) Foreign Application Priority Data
Jul. 29, 2014    (JP) .................... 2014-153727

(51) Int. Cl.
*B60H 1/00* (2006.01)
*B60H 1/06* (2006.01)
(Continued)

(52) U.S. Cl.
CPC ............... *B60H 1/06* (2013.01); *B60H 1/004* (2013.01); *B60H 1/00492* (2013.01);
(Continued)

(58) Field of Classification Search
CPC ...... B60H 1/06; B60H 1/004; B60H 1/00492; B60L 11/1874; B60L 1/003; B60L 1/02;
(Continued)

(56) References Cited

U.S. PATENT DOCUMENTS

| | | | |
|---|---|---|---|
| 6,672,415 B1* | 1/2004 | Tabata | B60K 6/365 180/65.25 |
| 7,273,120 B2* | 9/2007 | Tabata | B60K 6/365 180/65.265 |

(Continued)

FOREIGN PATENT DOCUMENTS

| | | |
|---|---|---|
| JP | 6-143981 | 5/1994 |
| JP | 2005-130629 | 5/2005 |

(Continued)

OTHER PUBLICATIONS

Fuse, et al., U.S. Appl. No. 15/329,617, titled: "Heat Storage System", filed Jan. 27, 2017 (27 pages).
(Continued)

*Primary Examiner* — Ljiljana V. Ciric
(74) *Attorney, Agent, or Firm* — Nixon & Vanderhye P.C.

(57) ABSTRACT

An energy management system is applied to a vehicle having a first power source, a first converter, an electricity storage part, and a second power source. The energy management system has a second converter, a heat storage part, a mode switching part, and a controller. The mode switching part switches between a heat storage mode and a heat radiation mode. The heat storage part changes to a first phase in a solid state when a temperature of the heat storage part is lower than or equal to a phase transition temperature, and changes to a second phase in a solid state when a temperature of the heat storage part exceeds the phase transition temperature. The controller controls the operations of the second converter and the mode switching part based on at
(Continued)

least one of an electricity storage condition of the electricity storage part and a conversion condition of the first converter.

9 Claims, 3 Drawing Sheets

(51) Int. Cl.
| | | |
|---|---|---|
| *B60L 1/00* | (2006.01) | |
| *B60L 1/02* | (2006.01) | |
| *F03G 7/00* | (2006.01) | |
| *B60W 10/30* | (2006.01) | |
| *B60W 20/00* | (2016.01) | |
| *F28D 20/02* | (2006.01) | |
| *F28F 27/00* | (2006.01) | |
| *B60L 11/18* | (2006.01) | |

(52) U.S. Cl.
CPC ............... *B60L 1/003* (2013.01); *B60L 1/02* (2013.01); *B60L 1/20* (2013.01); *B60L 11/18* (2013.01); *B60L 11/1874* (2013.01); *B60W 10/30* (2013.01); *B60W 20/00* (2013.01); *F28D 20/028* (2013.01); *F28F 27/006* (2013.01); *F03G 2007/007* (2013.01); *Y02E 60/145* (2013.01)

(58) Field of Classification Search
CPC .......... B60L 1/20; B60L 11/18; F28F 27/006; F28D 20/028; F03G 2007/007; B60W 20/00; B60W 10/30; Y02E 60/145
See application file for complete search history.

(56) References Cited

U.S. PATENT DOCUMENTS

| | | | |
|---|---|---|---|
| 7,317,985 B2 * | 1/2008 | Suzuki | B60H 1/004 701/113 |
| 8,516,806 B2 * | 8/2013 | Sujan | B60W 20/16 60/297 |
| 8,660,733 B2 * | 2/2014 | Tashiro | B60W 10/06 180/65.28 |
| 8,661,800 B2 * | 3/2014 | Levin | F01N 5/02 136/205 |
| 8,666,583 B2 * | 3/2014 | Tashiro | B60H 1/00735 180/65.28 |
| 8,825,242 B2 * | 9/2014 | Foster | B60L 1/003 701/22 |
| 8,899,025 B2 * | 12/2014 | Soukhojak | F01N 3/2006 60/274 |
| 9,469,291 B2 * | 10/2016 | Okamoto | B60W 10/30 |
| 9,598,072 B2 * | 3/2017 | Aoki | B60W 10/30 |
| 9,676,383 B2 * | 6/2017 | Akita | B60W 20/40 |
| 9,873,305 B2 * | 1/2018 | Bank | B60H 1/00492 |
| 9,950,638 B2 * | 4/2018 | Porras | B60L 11/187 |
| 10,069,179 B2 * | 9/2018 | Murata | B60L 1/003 |
| 2011/0081586 A1 * | 4/2011 | McAlister | C25B 1/00 429/422 |
| 2013/0240369 A1 * | 9/2013 | McAlister | C25B 11/03 205/343 |

FOREIGN PATENT DOCUMENTS

| | | |
|---|---|---|
| JP | 2010-163510 | 7/2010 |
| JP | 2010-259238 | 11/2010 |
| JP | 2011-27246 | 2/2011 |
| JP | 2011-121423 | 6/2011 |

OTHER PUBLICATIONS

U.S. Appl. No. 15/329,617, filed Jan. 27, 2017, Heat Storage System.

U.S. Appl. No. 15/329,608, filed Jan. 27, 2017, Energy Management System.

* cited by examiner

ENERGY MANAGEMENT SYSTEM

CROSS REFERENCE TO RELATED APPLICATION

This application is the U.S. national phase of International Application No. PCT/JP2015/003479 filed Jul. 9, 2015, which designated the U.S. and claims priority to Japanese Patent Application No. 2014-153727 filed on Jul. 29, 2014, entire contents of each of which are hereby incorporated herein by reference.

TECHNICAL FIELD

The present disclosure relates to an energy management system applied to a vehicle.

BACKGROUND ART

Conventionally, an energy management technique for improving a fuel consumption of a vehicle is known. In an energy management system, energy in various forms such as electricity and heat is transferred, stored, or used at a specified timing. Accordingly, energy efficiency can be improved.

For example, regarding a vehicle having an engine as an energy converter and a fuel cell, a system for storing heat generated in an energy conversion is known. In that system, heat generated in the energy conversion is radiated through a heat medium, and the heat of the heat medium is stored in a heat storage part, in a stationary condition. On the other hand, in a starting condition, the heat stored in the heat storage part is radiated to the heat medium, and the heat of the heat medium transfers to a heating target.

In addition, a system regarding a hybrid vehicle in which a part of power is regenerated as electricity, and the electricity is stored in a battery is proposed, for example, in Patent Literature 1.

PRIOR ART LITERATURES

Patent Literature

Patent Literature 1: JP 2011-121423 A

SUMMARY OF INVENTION

However, according to the system described in Patent Literature 1, there may be a case that is it difficult to store electricity effectively.

For example, an electrochemical reaction is too slow to charge the battery, and thereby electricity is stored insufficiently when an amount of regenerated electricity is very large. Alternatively, the battery cannot store electricity sufficiently when electricity is regenerated in a condition that a charged capacity in the battery is already reached an upper limit.

In this case, electricity that cannot be stored in the battery is emitted outside the system, and thereby an improving effect of the energy efficiency may deteriorate.

The present disclosure addresses the above issues, and it is an objective of the present disclosure to provide an energy management system that can improve energy efficiency.

An energy management system of the present disclosure is applied to a vehicle having a first power source, a first converter, an electricity storage part, and a second power source. The first power source radiates heat to a first heat medium when generating power by converting energy of a fuel supplied from an outside. The first converter converts the power generated in the first power source into electricity. The electricity storage part stores the electricity converted in the first converter. The second power source generates power by converting the electricity stored in the electricity storage part.

The energy management system has a second converter, a heat storage part, a mode switching part, and a controller. The second converter converts the electricity converted in the first converter into heat. The heat storage part stores the heat converted in the second converter. The mode switching part switches between a heat storage mode in which the heat storage part stores the heat converted in the second converter and a heat radiation mode in which the heat storage part radiates the heat to a heat transfer target. The controller controls operations of the second converter and the mode switching part.

The heat storage part changes to a first phase in a solid state when a temperature of the heat storage part is lower than or equal to a phase transition temperature, and changes to a second phase in a solid state when a temperature of the heat storage part exceeds the phase transition temperature. The heat storage part stores heat or radiates heat due to a phase transition between the first phase and the second phase. The controller controls the operations of the second converter and the mode switching part based on at least one of an electricity storage condition of the electricity storage part and a conversion condition of the first converter.

According to the above-described configuration, the electricity converted in the first converter can be prevented from being emitted outside the system, since the controller controls the operations of the second converter and the mode switching part based on at least one of the electricity storage condition of the electricity storage part and the conversion condition of the first converter. As a result, energy efficiency can be improved.

DESCRIPTION OF EMBODIMENTS

Embodiments of the present disclosure will be described hereafter referring to drawings. In the embodiments, a part that corresponds to or equivalents to a matter described in a preceding embodiment may be assigned with the same reference number.

First Embodiment

A first embodiment will be described referring to FIG. 1 and FIG. 2. The present embodiment is an example applying an energy management system of the present disclosure to a hybrid car (i.e., a vehicle).

Figure 1:
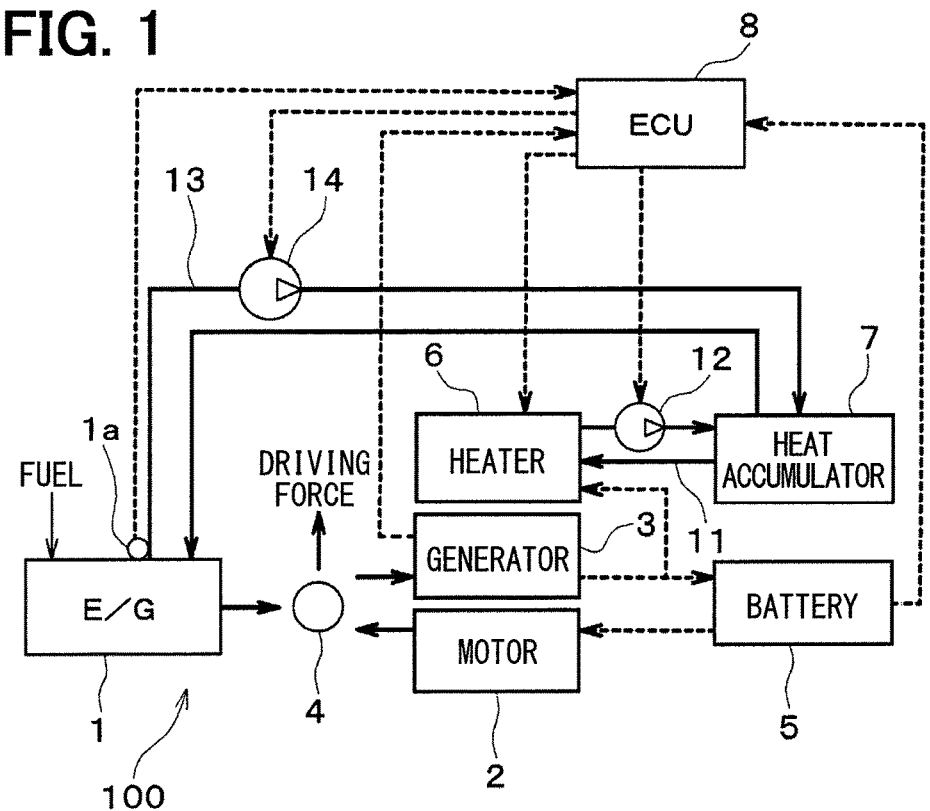
FIG. 1 is a schematic diagram illustrating a whole of an energy management system according to a first embodiment.
Figure 2:
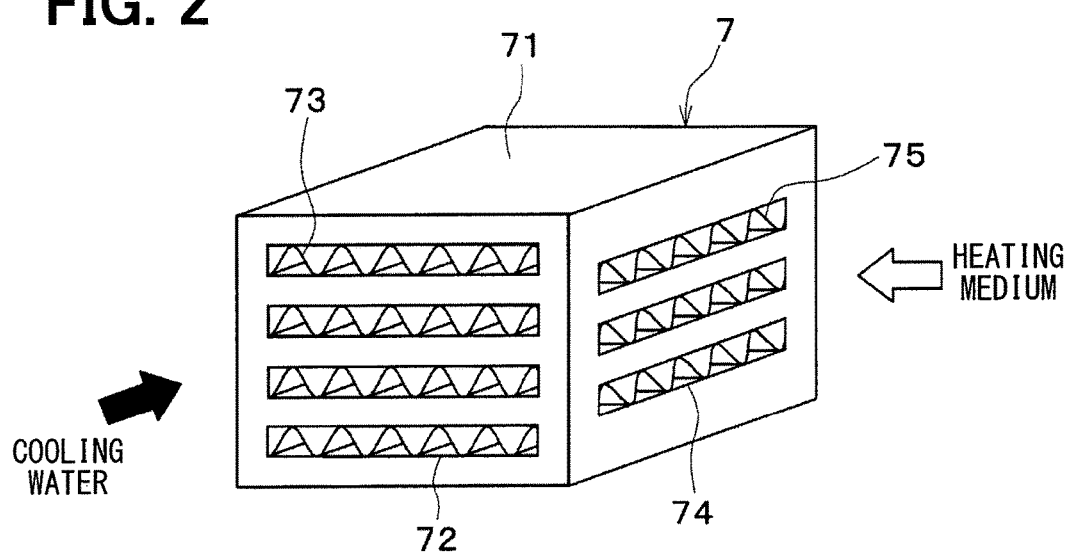
FIG. 2 is a schematic perspective view illustrating a heat storage part according to the first embodiment.

As shown in FIG. 1, a hybrid vehicle 100 has an engine (i.e., an internal combustion engine) 1, a motor (i.e., an electric motor) 2, a generator 3, a power distributive mechanism 4, and a battery 5.

An engine 1 is a driving power source for traveling that generates power by converting energy of fuel supplied from an outside. The engine 1 corresponds to a first power source. The engine 1 of the present embodiment is water cooling type and radiates heat to a cooling water when converting energy, i.e., when generating power. The cooling water corresponds to a first heat medium of the present disclosure according to the present embodiment.

The motor 2 is a driving power source for traveling that generates power by converting energy of electricity stored in the battery 5 described later. The motor 2 corresponds to a second power source. The generator 3 is an electricity generator that converts the power generated in the engine 1 into electricity. The generator 3 corresponds to a first converter of the present disclosure.

The power distributive mechanism 4 distributes or synthesizes power among the energy 1, the motor 2, and a driving shaft (not shown). The battery 5 is an electricity storage part that stores electricity converted in the generator 3. The battery 5 corresponds to an electricity storage part of the present disclosure.

An operation of the hybrid vehicle 100 will be described hereafter. The motor 2 generates a motor torque due to a discharge from the battery 5 when the hybrid vehicle 100 starts moving or is accelerated. The motor torque is synthesized with an engine torque in the power distributive mechanism 4 and transmitted to a tire (not shown), and thereby a driving torque is assisted.

The motor 2 generates the motor torque due to the discharge from the battery 5 when the engine 1 is started. The motor torque is transmitted to the engine 1 through the power distributive mechanism 4, and thereby the engine 1 is started by being cranked.

The power distributive mechanism 4 distributes an excess engine torque and transmits to the generator 3 when the hybrid vehicle 100 is decelerated. Accordingly, the generator 3 generates electricity and charges the battery.

The hybrid vehicle 100 has a heater 6 and a heat storage part 7. The heater 6 is an electric heater that converts the electricity converted in the generator 3 into heat. The heater 6 corresponds to a second converter. An operation of the heater 6 is controlled based on a control voltage or a control signal output from a controller 8 described later.

The heater 6 and the heat storage part 7 are connected to each other by a first heat medium passage 11 that provides a closed circuit between the heater 6 and the heat storage part 7. A first pump 12, which is an electric pump, is disposed in the first heat medium passage 11 and circulates the first heat medium in the first heat medium passage 11.

The heat storage part 7 stores heat, which is converted in the heater 6, through the heat medium.

The heat storage part 7 and the engine 1 are connected to each other by a cooling water passage 13 that provides a closed circuit between the heat storage part 7 and the engine 1. A second pump 14, which is an electric pump, is disposed in the cooling water passage 13 and circulates cooling water in the cooling water passage 13.

The heat storage part 7 radiates heat stored in the heat storage part 7 to the engine 1 through the cooling water. According to the present embodiment, the heat storage part 7 stores exhaust heat from the engine 1 through the cooling water.

Operations of the first pump 12 and the second pump 14 are controlled based on a control voltage and a control signal output from the controller 8 described later.

The heat storage part 7, specifically, is made of a heat storage material that changes to a first phase in a solid state when a temperature of the heat storage part 7 is lower than or equal to a phase transition temperature, and changes to a second phase in a solid state when a temperature of the heat storage part 7 exceeds the phase transition temperature. That is, the heat storage part 7 is made of a material that is kept in a solid state both in the first phase and the second phase. The heat storage part 7 stores heat or radiates heat due to a phase transition between the first phase and the second phase.

A heat storage material forming the heat storage part 7 according to the present embodiment will be described hereafter. The heat storage material is configured by a strongly correlated electron system compound in which a strong coulomb interaction affects between electrons configuring a substance.

According to the present embodiment, the strongly correlated electron system compound configuring the heat storage material is a compound, such as vanadium dioxide, including transition metal and oxygen. Alternatively, the strongly correlated electron system compound configuring the heat storage material may be a compound expressed by the following expression F1.

    F1

In the expression F1, M and N are different transition metals.

For example, M in the expression F1 may be vanadium. N in the expression F1 may be one selected from a group of tungsten, rhenium, molybdenum, ruthenium, niobium, and tantalum. The phase transition temperature of the heat storage material can be set to a required temperature by adding a specified amount of a metallic element such as tungsten to vanadium dioxide.

A configuration of the heat storage part 7 according to the present embodiment will be described hereafter. As shown in FIG. 2, the heat storage part 7 of the present embodiment has a body portion 71 that is made of the above-described heat storage material to have a block shape.

The body portion 71 is provided with cooling water path holes 72 in which the cooling water flows. First fins 73 as a heat transfer member are disposed inside the cooling water path holes 72 respectively. According to the present embodiment, the first fins 73 are a corrugated fin that has a crinkled shape provided with protruding portions of which tips are located on one side and the other side alternately in a cross section perpendicular to a flow direction of the cooling water. The first fins 73 increase a heat transfer area transferring heat between the cooling water, and thereby promotes a heat exchange between the cooling water and the heat storage material.

The body portion 71 has heat medium path holes 74 in which heat medium flows. The heat medium path holes 74 are provided such that a flow direction of the heat medium flowing in the heat medium path holes 74 is perpendicular to the flow direction of the cooling water flowing in the cooling water path holes 72. The cooling water path holes 72 and the heat medium path holes 74 are arranged alternately in an arrangement direction (i.e., an up-down direction in a paper plane having FIG. 2) in which the heat medium path holes 74 are arranged, in other words, in an arrangement direction in which the cooling water path holes 72 are arranged.

Second fins 75 as a heat transfer member are disposed inside the heat medium path holes 74 respectively. According to the present embodiment, the second fins 75 are a corrugated fin that has a crinkled shape provided with protruding portions of which tips are located on one side and the other side alternately in a cross section perpendicular to the flow direction of the heat medium. The second fins 75 increase a heat transfer area transferring heat between the heat medium, and thereby promotes a heat exchange between the heat medium and the heat storage material.

As shown in FIG. 1, the energy management system of the present embodiment is configured to be switchable between a heat storage mode in which the heat storage part 7 stores heat generated in the heater 6, and a heat radiation mode in which the heat storage part 7 radiates heat stored in the heat storage part 7 to the engine 1. The heat storage mode and the heat radiation mode will be described in detail later.

A schematic configuration of an electric controller of the energy management system of the present embodiment will be described hereafter. The controller (i.e., a control part) 8 has a well-known microcomputer including CPU, ROM and RAM and a peripheral circuit. The controller 8 controls operations of various control subject devices, which are connected to an output side of the controller 8, by performing calculations and procedures based on a control program stored in the ROM.

The various control subject devices such as the first pump 12 and the second pump 14 are connected to the output side of the controller 8.

On the other hand, devices such as the generator 3 and the battery 5 are connected to an input side of the controller 8. An electricity generating condition of the generator 3 and an electricity storage condition of the battery 5 are input to the controller 8. The electricity generating condition of the generator 3 is a conversion condition that the generator 3 is converting power into electricity.

Detection signals from a sensor group including a water temperature sensor 1a are input to the input side of the controller 8. The water temperature sensor 1a is a detection part that detects a temperature of the cooling water flowing in the cooling water passage 13. The temperature of the cooling water flowing in the cooling water passage 13 is, for example, a temperature of the cooling water on an outlet side of the engine 1.

The controller 8 controls the operations of the heater 6, the first pump 12, and the second pump 14 based on the electricity generating condition of the generator 3, the electricity storage condition of the battery 5 and the temperature of the cooling water detected by the water temperature sensor.

An operation of the energy management system of the present embodiment having the above-described configuration will be described hereafter.

The controller 8 operates the heater 6 to convert electricity into heat and performs the heat storage mode in which the heat storage part 7 store the heat when an electricity storage amount in the battery 5 is larger than or equal to a predetermined reference electricity storage amount (e.g., a full charge amount). In addition, the controller 8 controls the operation of the heater 6 to convert the electricity into heat and performs the heat storage mode in which the heat storage part 7 stores the heat when a conversion speed (i.e., an electricity generating speed) converting the power into the electricity in the generator 3 is faster than or equal to a predetermined reference speed.

Specifically, the controller 8 operates the first pump 12 such that the heat storage part 7 stores heat generated in the heater 6 through the heat medium flowing in the first heat medium when the electricity storage amount in the battery 5 is larger than or equal to the predetermined reference electricity storage amount and when the electricity generating speed of the generator 3 is faster than or equal to the reference speed. That is, the heat storage part 7, in the heat storage mode, stores heat of the heat medium that has a high temperature after exchanging heat with the heater 6.

According to the heat management system according to the present embodiment, the heat storage part 7, in the heat storage mode, stores exhaust heat from the engine 1. Specifically, the controller 8 operates the second pump 14 when the electricity storage amount in the battery 5 is larger than or equal to the predetermined reference electricity storage amount and when the electricity generating speed of the generator 3 is faster than or equal to the reference speed. Accordingly, the heat storage part 7 stores heat of the cooling water that has a high temperature after exchanging heat with the exhaust heat from the engine 1.

The controller 8 performs the heat radiation mode, in which heat stored in the heat storage part 7 transfers to the engine 1, when the temperature of the cooling water detected by the water temperature sensor 1a is lower than or equal to a predetermined reference temperature.

Specifically, the controller 8 stops the first pump 12 and operates the second pump 14 such that the heat storage part 7 radiates heat stored therein to the engine through the cooling water flowing in the cooling water passage 13 when the temperature of the cooling water detected by the water temperature sensor 1a is lower than or equal to the reference temperature. That is, heat of the cooling water heated by exchanging heat with the heat storage body 7 transfers to the engine 1 in the heat radiation mode. Accordingly, the engine 1 corresponds to the heat transfer target of the present disclosure according to the present embodiment.

Thus, the heat storage mode and the heat radiation mode can be switched between each other by controlling the operations of the first pump 12 and the second pump 14. Accordingly, the first pump 12 and the second pump 14 correspond to a mode switching part of the present disclosure according to the present embodiment.

As described above, the energy management system of the present embodiment converts the electricity generated in the generator 3 into heat in the heater 6 and performs the heat storage mode, when the electricity storage amount in the battery 5 is large and when the electricity generating speed in the generator 3 is fast, i.e., an electricity generating amount per unit time is large. As a result, the electricity generated in the generator 3 can be converted into heat, and the heat can be stored in the heat storage part 7.

In addition, the heat radiation mode is performed such that the heat stored in the heat storage part 7 is used for heating the engine 1 when the temperature of the cooling water falls, i.e., when heat is required.

Therefore, according to the energy management system according to the present embodiment, electricity generated in the generator 3 can be converted into heat, and the heat can be stored in the heat storage part 7, when the battery 5 hardly stores the electricity generated in the generator 3. As a result, the electricity generated in the generator 3 is not emitted outside the system, and thereby energy efficiency can be improved. Moreover, the heat stored in the heat storage part 7 is used for heating the engine 1, and thereby the energy efficiency can be further improved. That is, according to the energy management system of the present embodiment, the energy efficiency can be improved both electrically and thermally.

Second Embodiment

A second embodiment will be described hereafter referring to FIG. 3. The second embodiment is different from the first embodiment in a point that the heat storage part 7 stores exhaust heat from the battery, and that the heat stored in the heat storage part 7 is used for heating the battery 5.

Figure 3:
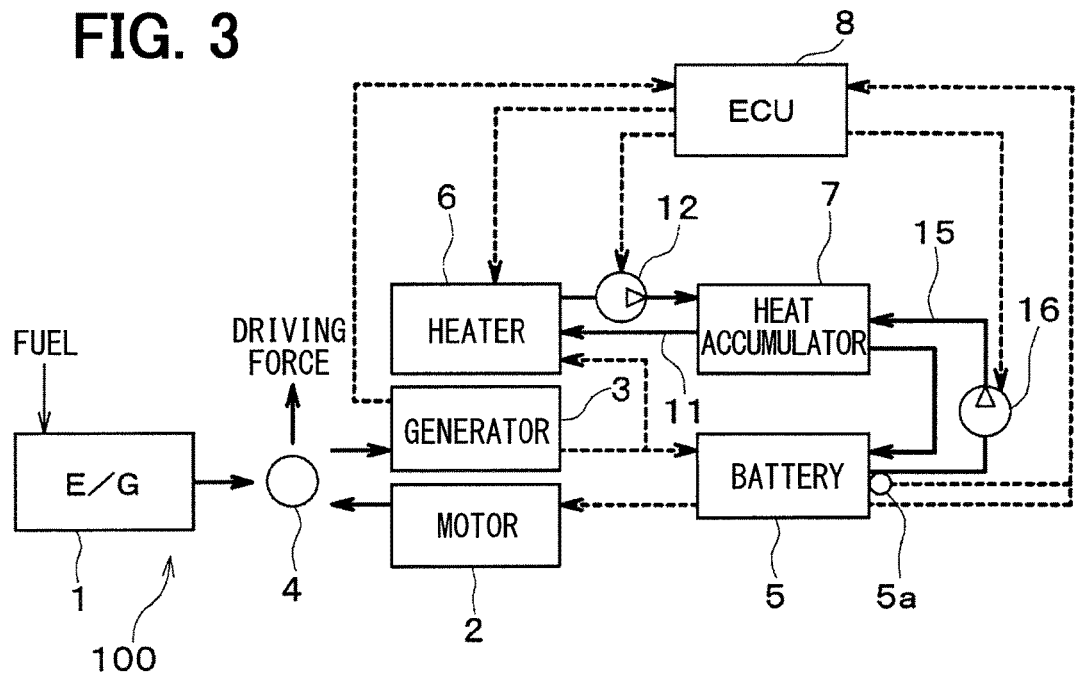
FIG. 3 is a schematic diagram illustrating a whole of an energy management system according to a second embodiment.

As shown in FIG. 3, the battery 5 and the heat storage part 7 are connected to each other by a second heat medium passage 15 that provides a closed circuit between the battery 5 and the heat storage part 7. A third pump 16, which is an electric pump, is disposed in the second heat medium passage 15 and circulates heat medium (e.g., gas) in the second heat medium passage 15. An operation of the third pump 16 is controlled based on a control voltage or a control signal output from the controller 8.

Accordingly, the heat storage part 7 stores exhaust heat from the battery 5 through the heat medium, and the heat stored in the heat storage part 7 transfers to the battery 5 through the heat medium. The heat medium corresponds to a second heat medium of the present disclosure, and the second heat medium passage 15 corresponds to a second heat medium passage of the present disclosure, according to the present embodiment.

A detection signal from a heat medium temperature sensor 5a is also input to the input side of the controller 8. The heat medium temperature sensor 5a is a detection part that detects a temperature of the heat medium flowing in the second heat medium passage 15. The temperature of the heat medium flowing in the second heat medium passage 15 is a temperature of the heat medium at an outlet side of the battery 5.

According to the present embodiment, the controller 8 controls operations of the heater 6, the first pump 12, and the third pump 16 based on the electricity generating condition of the generator 3, the electricity storage condition of the battery 5, and the temperature of the heat medium detected by the heat medium temperature sensor 5a.

According to the energy management system of the present embodiment, the heat storage part 7 stores the exhaust heat from the battery 5 as well in the heat storage mode. Specifically, the controller 8 operates the third pump 16 when the electricity storage amount in the battery 5 is larger than or equal to the reference electricity storage amount and when the electricity generating speed in the generator is faster than or equal to the reference speed. Accordingly, the heat storage part 7 stores heat of the heat medium that has a high temperature after exchanging heat with the exhaust heat from the battery 5.

According to the present embodiment, the controller 8 performs the heat radiation mode in which the heat storage part 7 radiates heat stored therein to the battery 5 when the temperature of the heat medium detected by the heat medium temperature sensor 5a is lower than or equal to a predetermined reference temperature.

Specifically, the controller 8 stops the first pump 12 and operates the third pump 16 such that the heat storage part 7 radiates heat stored therein to the battery 5 through the heat medium flowing in the second heat medium passage 15, when the temperature of the heat medium detected by the heat medium temperature sensor 5a is lower than or equal to the reference temperature. That is, heat of the heat medium heated by exchanging heat with the heat storage part 7 transfers to the battery 5 in the heat radiation mode. Accordingly, the battery 5 corresponds to the heat transfer target of the present disclosure according to the present embodiment.

Thus, the heat storage mode and the heat radiation mode can be switched between each other by controlling the operations of the first pump 12 and the third pump 16. Accordingly, the first pump 12 and the third pump 16 correspond to the mode switching part of the present disclosure according to the present embodiment.

Other configurations and operations are the same as the first embodiment. Thus, the energy management system of the present embodiment can provide the same effects as the first embodiment. Moreover, the heat storage part 7 stores the exhaust heat from the battery 5, and the heat stored in the heat storage part 7 can be used for heating the battery 5. As a result, the energy efficiency can be improved.

Third Embodiment

A third embodiment will be described hereafter referring to FIG. 4. The third embodiment is different from the first embodiment in a point that heat stored in the heat storage part 7 is used for an air conditioning for a vehicle compartment.

Figure 4:
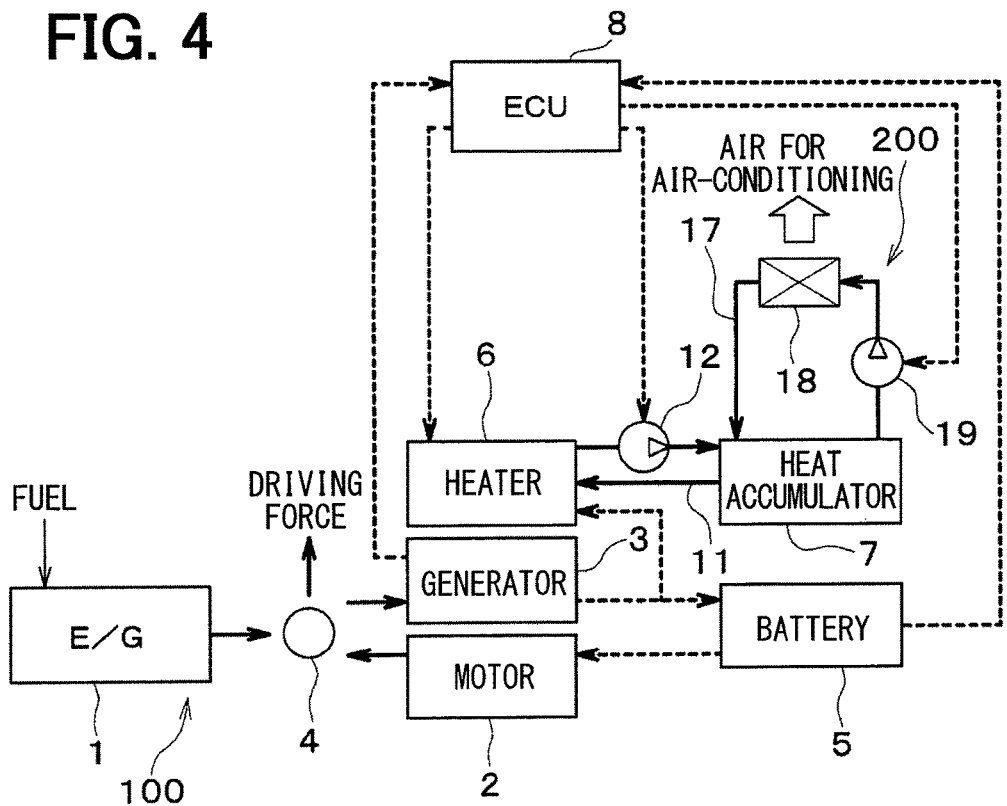
FIG. 4 is a schematic diagram illustrating a whole of an energy management system according to a third embodiment.

As shown in FIG. 4, the hybrid vehicle 100 of the present embodiment has a vehicle air conditioner 200 that performs the air conditioning for the vehicle compartment by blowing air (i.e., air-conditioning air) for the air conditioning into the vehicle compartment.

The vehicle air conditioner 200 has a third heat medium passage 17 in which heat medium, which has a high temperature after exchanging heat with the heat storage part 7, flows. A heating heat exchanger 18 is disposed in the third heat medium passage and heats the air for air conditioning by performing a heat exchange between the heat medium heated in the heat storage part 7 and air (i.e., the air for air conditioning) that is to be blown into the vehicle compartment.

A fourth pump 19, which is an electric pump, is disposed in the third heat medium passage 17 and circulates heat medium in the third heat medium passage 17. An operation of the fourth pump 19 is controlled based on a control voltage or a control signal output from the controller 8.

Accordingly, the heat storage part 7 radiates heat stored in the heat storage part 7 to the air through the heat medium.

A detection signal from an inside air temperature sensor (not shown) that detects a temperature in the vehicle compartment is also input to the input side of the controller 8. According to the present embodiment, the controller 8 controls operations of the heater 6, the first pump 12, and the fourth pump 19 based on the electricity generating condition of the generator 3, the electricity storage condition of the battery 5, and the temperature in the vehicle compartment detected by the inside air temperature sensor.

According to the present embodiment, the controller 8 performs the heat radiation mode, in which the heat storage part 7 radiates heat stored therein to the air, when the temperature in the vehicle compartment detected by the inside air temperature sensor is higher than or equal to a predetermined reference temperature.

Specifically, the controller 8 stops the first pump 12 and operates the fourth pump 19 such that heat stored in the heat storage part 7 transfers to the air through the heat medium flowing in the third heat medium passage 17, when the temperature in the vehicle compartment detected by the inside air temperature sensor is lower than or equal to the reference temperature. That is, heat of the heat medium, which is heated by exchanging heat with the heat storage part 7, transfers to the air in the heat radiation mode. Accordingly, the air for air conditioning corresponds to the heat transfer target of the present disclosure according to the present embodiment.

Thus, the heat storage mode and the heat radiation mode can be switched between each other by controlling the operations of the first pump 12 and the fourth pump 19. Accordingly, the first pump 12 and the fourth pump 19 correspond to the mode switching part of the present disclosure according to the present embodiment.

Other configurations and operations are the same as the first embodiment. Therefore, the energy management system of the present embodiment can provide the same effects as the first embodiment. Moreover, heat stored in the heat storage part 7 can be used for heating the air, i.e., for the air conditioning, and thereby the energy efficiency can be improved.

Fourth Embodiment

A fourth embodiment will be described hereafter referring to FIG. 5. The fourth embodiment is different from the first embodiment in a configuration of the heat storage part 7.

Figure 5:
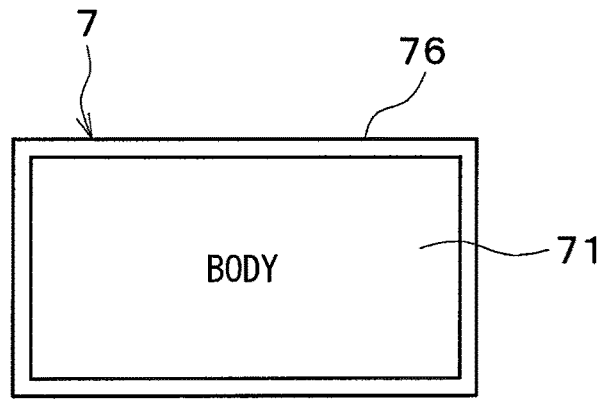
FIG. 5 is a schematic view illustrating a heat storage part according to a fourth embodiment.

As shown in FIG. 5, the heat storage part 7 has the body portion 71 and a high heat conductivity layer 76 covering the body portion 71. The body portion 71 is a heat storage layer configured by a strongly correlated electron system compound. The high heat conductivity layer 76 is made of metal having greater heat conductivity relative to a heat storage material forming the body portion 71. According to the present embodiment, the body portion 71 is made of $VO_2$, and the high heat conductivity layer 76 is made of $V_2O_3$.

According to the present embodiment, the high heat conductivity layer 76 having great heat conductivity covers around the heat storage material, and thereby a heat transfer between the heat storage material and the heat medium and a heat transfer between the heat storage material and the cooling water can be promoted. As a result, the heat storage part 7 can promptly store heat or radiate heat.

In addition, the high heat conductivity layer 76 can be formed easily in a required shape by making the high heat conductivity layer 76 with a material having great mechanical strength. For example, the high heat conductivity layer 76 may be formed in a fin shape such that a surface area of the high heat conductivity layer 76 increases, and a heat exchange performance between the high heat conductivity layer 76 and the heat medium and a heat exchange performance between the high heat conductivity layer 76 and the cooling water can be improved.

Fifth Embodiment

A fifth embodiment will be described hereafter referring to FIG. 6. The fifth embodiment is different from the first embodiment in a configuration of the heat storage part 7.

Figure 6:
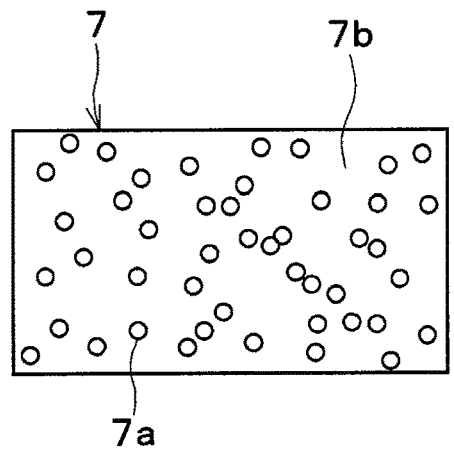
FIG. 6 is a schematic view illustrating a heat storage part according to a fifth embodiment.

As shown in FIG. 6, the heat storage part 7 is configured by a compound including a strongly correlated electron system compound 7a and a filler (i.e., a reinforcement part) 7b that is an inorganic compound. According to the present embodiment, the heat storage part 7 is made of $VO_2$ and ceramics.

According to the above-described configuration, a mechanical strength of the heat storage part 7 can be improved. A heat storage capacity of the heat storage part 7 can be changed by changing a combination ratio of the strongly correlated electron system compound 7a and the filler 7b.

Sixth Embodiment

A sixth embodiment will be described hereafter referring to FIG. 7. The sixth embodiment is different from the first embodiment in a configuration of the heat storage part 7.

Figure 7:
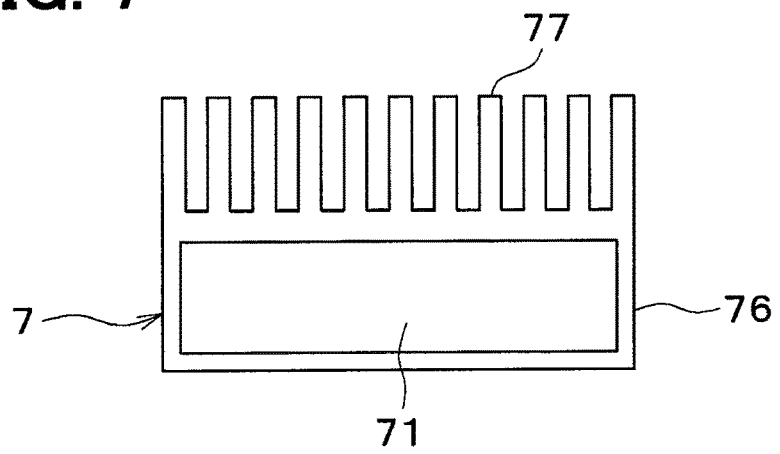
FIG. 7 is a schematic view illustrating a heat storage part according to a sixth embodiment.

As shown in FIG. 7, the heat storage part 7 has the body portion (i.e., a heat storage layer) 71, which is made of the strongly correlated electron system compound, and a fin (i.e., a heat transfer part) 77, which increases a heat transfer area transferring heat to and from the body portion 71. The fin 77 is made of metal having greater heat conductivity relative to the body portion 71.

The body portion 71 is covered with the high heat conductivity layer 76 that is made of metal having greater heat conductivity relative to the heat storage material forming the body portion 71. The high heat conductivity layer 76 is made of the same material as the fin 77 and is provided integrally with the fin 77. According to the present embodiment, the body portion 71 is made of $VO_2$, and the high heat conductivity layer 76 and the fin 77 are made of $V_2O_3$.

According to the present embodiment, a heat transfer area transferring heat between the heat storage part 7 and the heat medium can be increased, and a heat transfer area transferring heat between the heat storage part 7 and the cooling water can be increased, by disposing the fin 77 in the heat storage part 7. Accordingly, a heat exchange performance between the heat storage part 7 and the heat medium and a heat exchange performance between the heat storage part 7 and the cooling water can be improved.

(Other Modifications)

It should be understood that the present disclosure is not limited to the above-described embodiments and intended to cover various modification within a scope of the present disclosure as described hereafter. Technical features disclosed in the above-described embodiments may be combined as required in a feasible range.

(1) An example in which the hybrid vehicle 100 has the motor 2 and the generator 3 is described in the above-described embodiments. However, a motor generator that functions as both of an electric motor and an electricity generator may be used.

(2) An example using a corrugated fin as the first fins 73 is described in the above-described embodiments, however a shape of the first fins 73 is not limited to that example.

For example, the first fins 73 may be a straight fin that has a rectangular corrugated shape in a cross section perpendicular to the flow direction of the heat medium. Alternatively, the first fins 73 may be a waved fin in which crinkled portions of the rectangular corrugated shape of the straight fin are further bent in the flow direction of the heat medium to have a waved shape. Alternatively, the first fins 73 may be an off-set fin in which the crinkled portions of the rectangular corrugated shape of the straight fin have notches respectively, and the notches are bent intermittently.

Similarly, an example using a corrugated fin as the second fins 75 is described in the above-described embodiments. However, the second fins 75 may be the straight fin, the waved fin, or the off-set fin.

(3) An example, in which the controller 8 controls the operation of the mode switching part such as the heater 6 and the first pump 12 based on the electricity generating condition of the generator 3, the electricity storage condition of the battery 5, and the temperature of the cooling water detected by the water temperature sensor 1a, is described in the above-described embodiments. However, a control performed by the controller 8 is not limited to that example.

For example, the controller 8 may control the operation of the mode switching part such as the heater 6 and the first pump 12 based on at least one of the electricity generating condition of the generator 3, the electricity storage condition of the battery 5, and the temperature of the cooling water detected by the water temperature sensor 1a.

More specifically, an example, in which the controller 8 performs the heat storage mode when the electricity storage amount in the battery 5 is larger than or equal to the reference electricity storage amount and when the electricity generating speed of the generator 3 is higher than or equal to the reference speed, is described in the above-described embodiments. However, a mode switching control performed by the controller 8 is not limited to that example.

For example, the controller 8 may perform the heat storage mode when the electricity storage amount in the battery 5 is larger than or equal to the reference electricity storage amount. Alternatively, the controller 8 may perform the heat storage mode when the electricity generating speed of the generator 3 is faster than or equal to the reference speed.

(4) An example using the pumps 12, 14, 16, 19 as the mode switching part is described in the above-described embodiments. However, for example, an opening and closing valve may be arranged in the cooling water passage and the heat medium passage to function as the mode switching part.

(5) An example making the heat storage part 7 with $VO_2$ and ceramics is described in the above-described fifth embodiment. However, the heat storage part 7 may include another compound.

The invention claimed is:

1. An energy management system applied to a vehicle, the vehicle has:
a first power source that radiates heat to a first heat medium when generating power by converting an energy of a fuel supplied from an outside;
a first converter that converts the power generated in the first power source into an electricity;
an electricity storage part that stores the electricity converted in the first converter; and
a second power source that generates power by converting the electricity stored in the electricity storage part;
the energy management system comprising:
a second converter that converts the electricity converted in the first converter into heat;
a heat storage part that stores the heat converted in the second converter;
a mode switching part that switches between a heat storage mode in which the heat storage part stores the heat converted in the second converter and a heat radiation mode in which the heat storage part radiates the heat to a heat transfer target; and
a controller that controls operations of the second converter and the mode switching part, wherein
the heat storage part changes to a first phase in a solid state when a temperature of the heat storage part is lower than or equal to a phase transition temperature, and changes to a second phase in a solid state when a temperature of the heat storage part exceeds the phase transition temperature,
the heat storage part stores heat or radiates heat due to a phase transition between the first phase and the second phase, and
the controller controls the operations of the second converter and the mode switching part based on at least one of an electricity storage condition of the electricity storage part and a conversion condition of the first converter.

2. The heat management system according to claim 1, wherein
the controller controls the operation of the second converter to convert the electricity into heat and controls the operation of the mode switching part to perform the heat storage mode, when an electricity storage amount in the electricity storage part is larger than or equal to a predetermined reference electricity storage amount.

3. The heat management system according to claim 1, wherein
the controller controls the operation of the second converter to convert the electricity into heat and controls the operation of the mode switching part to perform a heat storage mode, when a conversion speed converting the power into the electricity in the first converter is faster than or equal to a predetermined reference speed.

4. The heat management system according to claim 1, wherein
the heat transfer target is the first power source,
the heat storage part, in the heat storage mode, stores both of heat converted in the second converter and heat of the first heat medium, and
the heat storage part, in the heat radiation mode, radiates the heat stored therein to the first power source through the first heat medium.

5. The heat management system according to claim 1, wherein
the heat transfer target is the electricity storage part,
the vehicle has a second heat medium passage in which a second heat medium flows, the second heat medium is a fluid that receives or supplies heat between each of the heat storage part and the electricity storage part,
the electricity storage part radiates heat to the second heat medium,
the heat storage body, in the heat storage mode, stores both of heat converted in the second converter and heat of the second heat medium, and
the heat storage body, in the heat radiation mode, radiates the heat stored therein to the electricity storage part through the second heat medium.

6. The heat management system according to claim 1, wherein
the vehicle has a vehicle air conditioner that air conditions a vehicle compartment by blowing air for air conditioning into the vehicle compartment,
the heat transfer target is the air for air conditioning, and
the heat storage part, in the heat radiation mode, radiates heat stored therein to the air for air conditioning.

7. The heat management system according to claim 1, wherein
the heat storage part has a heat storage layer, which is made of a strongly correlated electron system compound, and a high heat conductivity layer, which is made of a material having greater heat conductivity relative to the heat storage layer.

8. The heat management system according to claim 1, wherein
the heat storage part is configured by a compound including a strongly correlated electron system compound and an inorganic compound.

9. The heat management system according to claim 1, wherein
the heat storage part has a heat storage layer, which is made of a strongly correlated electron system compound, and a heat transfer part, which increases a heat transfer area transferring heat to and from the heat storage layer.

* * * * *